United States Patent
Kramlich et al.

(10) Patent No.: US 12,352,269 B2
(45) Date of Patent: Jul. 8, 2025

(54) COMPRESSOR-OIL RECEIVING DEVICE AND COMPRESSOR SYSTEM HAVING A COMPRESSOR-OIL RECEIVING DEVICE OF THIS TYPE

(71) Applicant: KNORR-BREMSE SYSTEME FÜR SCHIENENFAHRZEUGE GMBH, Munich (DE)

(72) Inventors: Adrian Kramlich, Munich (DE); Cornelia Springl, Bernau am Chiemsee (DE); Thomas Kipp, Munich (DE); Wolfgang Kuhn, Munich (DE); Johannes Graw, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 0 days.

(21) Appl. No.: 18/692,155

(22) PCT Filed: Aug. 29, 2022

(86) PCT No.: PCT/EP2022/073951
§ 371 (c)(1),
(2) Date: Mar. 14, 2024

(87) PCT Pub. No.: WO2023/041314
PCT Pub. Date: Mar. 23, 2023

(65) Prior Publication Data
US 2025/0137456 A1    May 1, 2025

(30) Foreign Application Priority Data
Sep. 15, 2021   (DE) ................. 10 2021 210 221.2

(51) Int. Cl.
*F04C 29/02* (2006.01)
*F04C 18/16* (2006.01)
*F16N 19/00* (2006.01)

(52) U.S. Cl.
CPC ............ *F04C 29/02* (2013.01); *F16N 19/003* (2013.01); *F04C 18/16* (2013.01); *F04C 2240/809* (2013.01); *F04C 2270/24* (2013.01)

(58) Field of Classification Search
CPC ...... F04C 29/02; F04C 18/16; F04C 2270/24; F04C 2240/809; F16N 19/003
(Continued)

(56) References Cited

U.S. PATENT DOCUMENTS 1,603,426 A * 10/1926 Thomson ................ F25B 43/02
                                                    418/101
3,191,854 A *  6/1965 Lowler ............... F04C 29/0007
                                                      418/5

(Continued)

FOREIGN PATENT DOCUMENTS

DE   1942763 U   7/1966
DE   3876973    2/1993
(Continued)

OTHER PUBLICATIONS

International Search Report corresponding to PCT/EP2022/073951 dated Dec. 13, 2022.

*Primary Examiner* — Henry Y Liu
(74) *Attorney, Agent, or Firm* — Barnes & Thornburg LLP

(57) ABSTRACT

A compressor-oil-receiving apparatus for a compressor system filled with a compressor oil for transfer into the compressor system. The apparatus includes a housing which forms a receiving volume for the compressor oil, and an oil filler neck with a filling opening on a side, which is directed away from the receiving volume and with an outlet opening
(Continued)

on a side which is directed toward the receiving volume, wherein the oil filler neck forms a housing opening for filling of the receiving volume with the compressor oil, and the outlet opening is arranged such that, through filling of the receiving volume, an air volume enclosed by the housing, and the compressor oil that has been introduced is formed in the receiving volume.

14 Claims, 2 Drawing Sheets

(58) Field of Classification Search
 USPC ........................................................ 184/6.16
 See application file for complete search history.

(56) References Cited

U.S. PATENT DOCUMENTS

| | | | | |
|---|---|---|---|---|
| 3,722,187 A * | 3/1973 | Potter | ................... | F04C 29/026 417/313 |
| 4,138,996 A * | 2/1979 | Cartland | ............... | F24D 11/003 137/59 |
| 4,246,926 A * | 1/1981 | Morello | ................. | F16L 55/07 137/234.5 |
| 4,475,876 A * | 10/1984 | Olen | ....................... | F04C 29/02 137/207.5 |
| 4,478,054 A * | 10/1984 | Shaw | .................... | F04C 29/026 418/98 |
| 4,834,632 A * | 5/1989 | Gatecliff | ............. | F16K 15/1402 417/570 |
| 5,053,122 A * | 10/1991 | Carr | ........................ | F16N 39/06 210/167.04 |
| 5,492,461 A * | 2/1996 | Kitchener | .............. | B01D 45/02 55/DIG. 17 |
| 5,697,763 A * | 12/1997 | Kitchener | ............. | F04C 29/042 418/84 |
| 6,082,982 A * | 7/2000 | Rosser, Jr. | ............ | F04C 29/026 184/6.16 |
| 6,484,504 B1 * | 11/2002 | Aquino | ................. | F04D 23/008 60/726 |
| 7,052,249 B2 * | 5/2006 | Virgilio | ................... | F04C 29/04 417/313 |
| 7,056,108 B2 * | 6/2006 | Behling | .................. | F04C 29/04 418/88 |
| 8,196,708 B2 * | 6/2012 | Kung | ...................... | F04B 43/06 184/29 |
| 8,978,400 B2 * | 3/2015 | Dunn | ..................... | F04B 39/06 62/84 |
| 8,978,826 B2 * | 3/2015 | Kim | ................... | F04B 39/0253 417/372 |
| 9,347,448 B2 * | 5/2016 | Köck | .................... | F04C 29/028 |
| 9,353,750 B2 * | 5/2016 | Halttunen | ................ | F04C 29/04 |
| 9,587,533 B2 * | 3/2017 | Noguchi | ................. | F01M 11/12 |
| 11,932,411 B2 * | 3/2024 | Banville | ............... | F16N 19/003 |
| 2009/0000873 A1 * | 1/2009 | Mollering | ............. | F04D 29/057 184/6.16 |
| 2013/0081387 A1 * | 4/2013 | Zeolla | ................ | F15B 21/0423 60/456 |
| 2015/0040817 A1 * | 2/2015 | Noguchi | ................ | G01F 23/66 116/228 |
| 2023/0399119 A1 * | 12/2023 | Banville | ................ | B67D 7/365 |

FOREIGN PATENT DOCUMENTS

| | | |
|---|---|---|
| DE | 19834387 A1 | 2/2000 |
| EP | 0003069 A1 | 7/1979 |
| JP | 2013514474 A | 4/2013 |
| WO | 2011116924 A1 | 9/2011 |

* cited by examiner

COMPRESSOR-OIL RECEIVING DEVICE AND COMPRESSOR SYSTEM HAVING A COMPRESSOR-OIL RECEIVING DEVICE OF THIS TYPE

CROSS REFERENCE AND PRIORITY CLAIM

This patent application is a U.S. National Phase of International Patent Application No. PCT/EP2022/073951 filed Aug. 29, 2022, which claims priority to German Patent Application No. 10 2021 210 221.2, the disclosure of which being incorporated herein by reference in their entireties.

FIELD

Disclosed embodiments relate to a compressor-oil-receiving apparatus for a compressor system, for being filled with a compressor oil for transfer into the compressor system, and to a compressor system having such a compressor-oil-receiving apparatus.

BACKGROUND

According to the type of the compressor, such as, for example, in the case of oil-lubricated compressors, lubrication and/or cooling of components of the compressor system are/is realized by way of a compressor oil. The oil level is checked, during maintenance, regularly, with the compressor oil being replenished as appropriate. For this purpose, the compressor oil is introduced into a receiving volume via an oil filling opening. The receiving volume is in this case greater than the maximum oil level intended for consumption. If more compressor oil is introduced into the receiving volume than is intended for the maximum oil level, overfilling can occur, which can disrupt operation or damage components.

SUMMARY

In view of the above statements, the disclosed embodiments provide a compressor-oil-receiving apparatus for a compressor system, for being filled with a compressor oil for transfer into the compressor system, and to a compressor system having such a compressor-oil-receiving apparatus, by way of which the risk of overfilling of a receiving volume for a compressor oil can be at least reduced.

BRIEF DESCRIPTION OF FIGURES

Disclosed embodiments are discussed in more detail below on the basis of exemplary embodiments with reference to the appended figures. In the figures, specifically.

Figure 1:
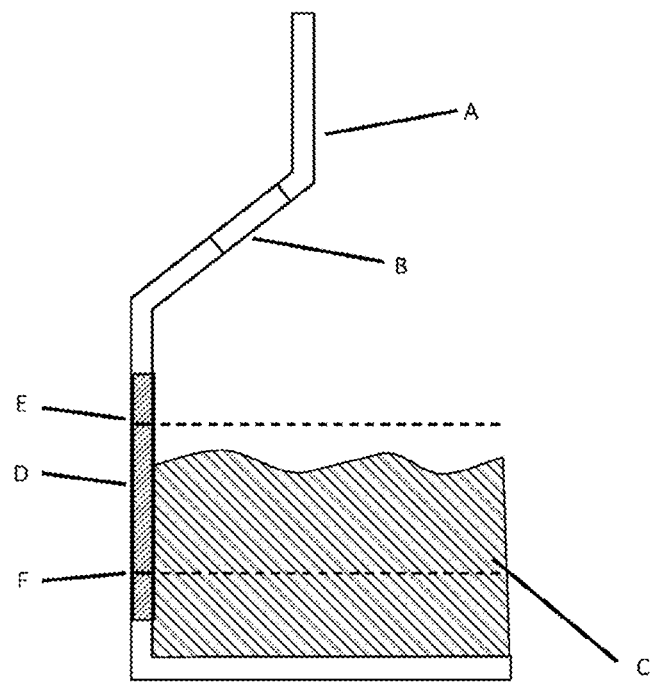
FIG. 1 shows a schematic cross-sectional illustration of a compressor-oil-receiving apparatus according to an example of the prior art.

According to disclosed embodiments, a compressor-oil-receiving apparatus for a compressor system, for being filled with a compressor oil for transfer into the compressor system, has a housing which forms a receiving volume for the compressor oil, and an oil filler neck with a filling opening on a side which is directed away from the receiving volume and with an outlet opening on a side which is directed toward the receiving volume. The oil filler neck forms a housing opening for filling of the receiving volume with the compressor oil, and the outlet opening is arranged such that, through filling of the receiving volume, an air volume enclosed by the housing, and the compressor oil that has been introduced is able to be formed in the receiving volume.

Overfilling of the receiving volume is thus prevented in that the air volume enclosed by the housing, and the compressor oil that has been introduced forms an air cushion in the receiving volume, which air cushion limits the filling of the receiving volume.

The oil filler neck may in this case be formed by an opening in the housing, wherein the filling opening is formed by a housing wall which is directed away from the receiving volume and the outlet opening is formed by a housing wall which is directed toward the receiving volume. The extent of the oil filler neck perpendicular to the opening surfaces of the filling opening and the outlet opening thus corresponds to the thickness of the housing wall in this region. Optionally, the oil filler neck has a relatively large extent in a direction perpendicular to the opening surfaces, however, so that, in the case of the receiving limit due to the enclosed air being reached, the compressor oil does not run immediately out of the oil filler neck on a side directed away from the receiving volume.

The outlet opening of the oil filler neck may be arranged such that the opening surface of the outlet opening is arranged so as to be directed toward, in particular substantially parallel to, the level surface of the compressor oil that has been or is to be introduced into the receiving volume. Alternatively, the outlet opening may also extend in the direction of the rise height of the compressor oil.

In one configuration, the oil filler neck extends at least partially into the enclosed air volume.

An intended extent of the oil filler neck can thus be achieved with a reduced interference contour by way of the oil filler neck on a side of the housing that is directed away from the receiving volume. In particular if the outlet opening of the oil filler neck is situated opposite the level surface of the compressor oil that has been or is to be introduced into the receiving volume, the air volume enclosed by the housing, and the compressor oil that has been introduced, can be formed in a simple manner in the receiving region between the outlet opening and a housing region adjoining the outlet opening in the direction of the rise height of the compressor oil. The housing can thus also be retrofitted in a simple manner via the introduction of a corresponding oil filler neck.

In particular, the filling opening and the outlet opening are arranged at different heights in the direction of a rise height of the compressor oil in the receiving volume, and the distance of the filling opening from the respective level height of the compressor oil in the receiving volume, at least until an intended maximum oil level has been reached, is greater than the distance of the outlet opening from the respective level height.

As viewed in the direction of gravitational force, the filling opening is thus situated above the outlet opening. The filling process thus requires no further auxiliary aids, such as pumps or the like. In particular, by way of a corresponding orientation, it is also possible for air to continue to escape until the outlet opening is completely covered by the level of the compressor oil in the receiving volume. The covering of the outlet opening then allows the enclosed air volume to be formed in the receiving volume.

According to one configuration, the position of the outlet opening corresponds to the maximum oil level.

The maximum oil level relates to a maximum oil level intended for a respective compressor or a respective compressor system and/or the respective operation to promote trouble-free operation. The intended maximum oil level can accordingly be predefined directly by the arrangement of the outlet opening in relation to the housing. In other words, the arrangement of the outlet opening of the oil filler neck defines not only a maximum filling volume but, specifically, the intended maximum oil level.

According to one refinement, the position of the outlet opening is settable.

Accordingly, it is also possible for the maximum oil level or the maximum filling volume for the compressor oil to be adapted. For example, the housing may have multiple receiving parts for the oil filler neck such that the outlet opening is arrangeable at different positions. Receiving parts not intended for use in each case can be closed off for example via a blind plug.

In particular, the oil filler neck is movable at least with a movement component in the direction of the rise height of the compressor oil in the receiving volume.

For example, the oil filler neck may be able to be screwed into the housing, so that, via the screwing-in depth, the position of the outlet opening in the receiving volume of the housing, the maximum oil level or a maximum filling volume is predefinable. Alternatively, or additionally, the oil filler neck may also be mounted so as to be rotatable about an axis perpendicular to its direction of extent from the filling opening to the outlet opening and parallel to the level surface of the compressor oil, in order to be movable in the direction of the rise height of the compressor oil. Such a point of rotation may be situated substantially at the height of the receiving part of the oil filler neck in the housing, in order for example to keep the sealing outlay low, for ensuring the enclosed air volume.

In one refinement, the oil filler neck has a position indicator which is configured to indicate a position of the outlet opening.

The position indicator may be a visual, acoustic and/or other signal or indication apparatus that permits specification and/or possibility of deduction with regard to a position of the outlet opening and/or a maximum filling volume, in particular a maximum oil level. For example, provision may be made at the outlet opening of at least one distance sensor which detects the distance between the outlet opening and a housing wall situated oppositely in the rise height of the compressor oil or another reference point. The distance may in each case be indicated in an analog manner, that is to say for example as a respective absolute value, or in a digital manner with regard to predefined target or limit values, that is to say reaching of the target or limit value or deviation therefrom. The indication may be realized optically by way of a display and/or a signal lamp and/or acoustically by way of a signal tone, for example with different frequency according to distance. It is alternatively, or additionally, also possible for provision to be made for signal-related linking of a blocking device, by which the filling via the oil filler neck is blocked if the position of the outlet opening is insufficient, that is to say this is closed off for example, and is released again only in a permissible position region.

In particular, the filling opening, at least until a predetermined depth of movement of the oil filler neck into the receiving volume has been reached, projects beyond a side of the housing that is directed away from the receiving volume and, in this projecting region, has a scale as a position indicator.

The scale is thus able to be read off from the outside and permits simple control of the position of the outlet opening of the oil filler neck. The scale may be provided so as to be continuous or else in predetermined steps. The scale may for example directly indicate a screw-in depth and thus a corresponding change in position or else directly indicate a filling volume which is matched to the respective housing or receiving volume. The scale may also comprises a number of scales, so that the oil filler neck is usable for different housings or receiving volumes of different compressor systems.

In one configuration, the compressor-oil-receiving apparatus has a fill-level indicator which indicates at least a minimum oil level and/or the maximum oil level.

The fill-level indicator can indicate a fill level in an optical, acoustic and/or other signal-related manner similarly to the position indicator for the outlet opening of the oil filler neck. For example, provision may be made of a float which, if the intended minimum and/or maximum oil level is reached, switches a corresponding switch. The switching of the switch can then in turn be transformed into an optical and/or acoustic signal. Alternatively, or additionally, use may be made of a distance sensor which detects the distance from a level surface in the direction of the rise height of the compressor oil in the receiving volume or from a corresponding float body. Here, too, the acoustic and/or visual indication of the fill level, in particular at least the minimum and/or maximum oil level, may be realized in an analog or digital manner. It is also the case that the fill-level indicator, in the case of signal-related linking to a blocking device, can block further oil filling via the oil filler neck and/or activate a pumping-out apparatus for removing surplus compressor oil if the maximum oil level is detected.

In particular, the fill-level indicator is in the form of at least one oil inspection glass in the housing, which, at least in the region of the minimum oil level and/or the maximum oil level, extends in the direction of the rise height of the compressor oil in the receiving volume.

The minimum and/or maximum oil level can be read off directly from the outside in a simple manner via the oil inspection glass. In particular, the oil inspection glass extends in the direction of the rise height of the compressor oil over the entire region from the minimum oil level to the maximum oil level. The beginning of the oil inspection glass, pointing downward in the direction of gravitational force, corresponds in this case for example to the minimum oil level and the end of the oil inspection glass, pointing upward in the direction of gravitational force, corresponds to the maximum oil level.

According to one refinement, the oil inspection glass is arranged and/or dimensioned in such a way that, via the oil inspection glass, the position of the outlet opening of the pressure connector in the receiving volume is also able to be identified.

The oil inspection glass is thus usable both as a fill-level indicator for the compressor oil in the receiving volume and as a position indicator for the outlet opening of the pressure connector. In particular, via this, it is also possible for lack of tightness in the housing to be detected if the level of the compressor oil, counter to an intended configuration, rises further above the outlet opening of the oil filler neck.

In one configuration, the oil inspection glass and/or an adjoining region of the housing have/has a scale.

The scale optionally comprises at least the minimum and/or maximum oil level. Optionally, the oil inspection glass, with corresponding scale, extends beyond the minimum and maximum oil levels in the rise height of the level of the compressor oil in order for the level line to be able to be observed better specifically in the region of the minimum oil level and of the maximum oil level.

If the scale is provided on the oil inspection glass, the scale can be adapted in a simple manner to different conditions and/or requirements through replacement of the oil inspection glass.

In a further aspect, the disclosed embodiments relate to a compressor system having an above-described compressor-oil-receiving apparatus, wherein the receiving volume for the compressor oil is formed at least partially by an oil sump of the compressor system.

The compressor-oil-receiving apparatus can thus be installed directly in pre-existing areas of the compressor system, which makes possible a compact design. In particular, the oil sump of the compressor system is able to be retrofitted in a simple manner by way of a corresponding oil filler neck.

In one configuration, the compressor system has a screw compressor.

The screw compressor is in particular an oil-lubricated screw compressor.

Further configurations and advantages of the compressor system emerge analogously to the statements concerning the possible configurations and advantages of the compressor-oil-receiving apparatus. Corresponding features are thus directly transferable to the compressor system, even where the compressor-oil-receiving apparatus is used.

FIG. 1 shows a schematic cross-sectional illustration of a compressor-oil-receiving apparatus according to an example of the prior art. The compressor-oil-receiving apparatus has a compressor housing A which forms a receiving volume for a compressor oil C. In what is an upper region of the housing in the direction of gravitational force during use appropriate to the application, a housing opening is formed as an oil filling opening B via which the compressor oil C is able to be introduced into the receiving volume of the compressor housing. In this case, the oil filling opening B is arranged above a maximum oil level E in the direction of gravitational force during use of the compressor appropriate to the application. Accordingly, it is possible for compressor oil to be introduced into the receiving volume even beyond the maximum oil level E. A filling quantity whereby the maximum oil level E is exceeded can disrupt the operation of the compressor. For the purpose of controlling the level of the compressor oil C in the receiving volume of the compressor housing A, the compressor housing A has an oil inspection glass D as fill-level indicator that has a scale indicating at least a minimum oil level F and a maximum oil level E. Avoidance of overfilling thus requires constant observation of the level of the compressor oil C in the receiving volume of the compressor housing A via the oil inspection glass D during a filling process. Damage to and/or soiling of the oil inspection glass and also subjective viewing angles during the observation and light conditions can in this case influence readability and reading accuracy.

Figure 2:
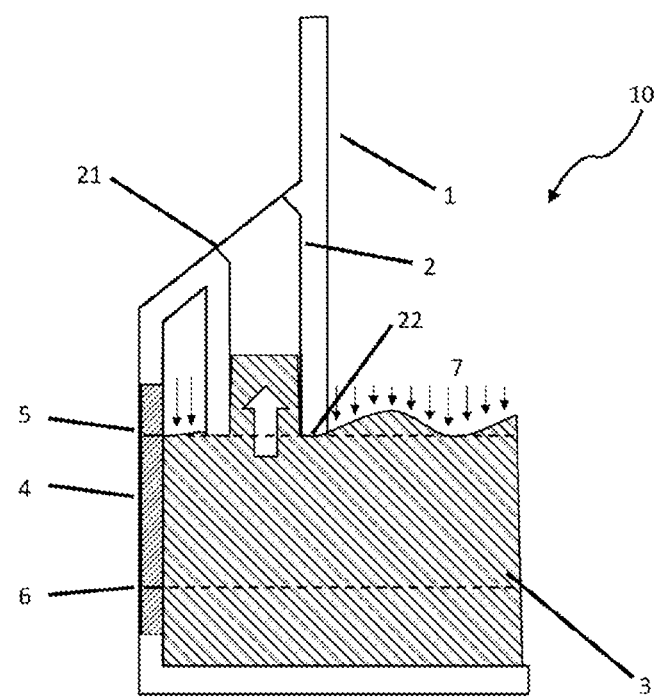
FIG. 2 shows a schematic cross-sectional illustration of a compressor-oil-receiving apparatus according to a first exemplary embodiment.

FIG. 2 shows a schematic cross-sectional illustration of a compressor-oil-receiving apparatus 10 according to a first exemplary embodiment for reducing or else avoiding the risk of overfilling. The compressor-oil-receiving apparatus 10 has a compressor housing 1 which forms a receiving volume for a compressor oil 3. The compressor-oil-receiving apparatus 10 moreover has an oil filler neck 2 which is formed integrally with the compressor housing 1. The integral formation of the oil filler neck 2 with the compressor housing 1 results in a connection tightness being improved, so that the risk of leakage, in particular with regard to escape of air, is reduced or avoided via the attachment. In the direction of the rise height of the compressor oil 3 in the receiving volume, the oil filler neck 2 has an outlet opening 22 directed toward the level of the compressor oil 3 and has a filling opening 21 directed away from the level of the compressor oil 3. The filling opening 21 terminates here flush with that side of the compressor housing 1 which is directed away from the receiving volume for the compressor oil 3, by way of example. In alternative embodiments, it is however also possible for the filling opening 21 or the region of the oil filler neck 2 with the filling opening 21 to project on a side of the compressor housing 1 that is directed away from the receiving volume. The filling opening 21 is able to be closed off via a cover (not shown). The oil filler neck 2 extends in the direction of gravitational force or in the direction of the rise height of the level of the compressor oil 3 into the receiving volume of the compressor housing 1. The outlet opening 22 is thus arranged below the filling opening 21 in the direction of gravitational force. The outlet opening 22 is moreover arranged between upper and lower volume delimitations of the receiving volume for the compressor oil 3 in the direction of gravitational force, which volume delimitations are formed by the compressor housing 1. The position of the outlet opening 22 in the direction of gravitational force corresponds to a maximum oil level 5, which is predetermined, in order to avoid overfilling. The compressor housing 1 of the compressor-oil-receiving apparatus 10 moreover has an oil inspection glass 4 as an indicator for the level of the compressor oil 3 in the receiving volume. The oil inspection glass 4 extends in the direction of the rise height of the level of the compressor oil 3 in the receiving volume over a region covering a minimum oil level 6 and the maximum oil level 5. The minimum oil level 6 and the maximum oil level 5 correspond to a corresponding scale on the oil inspection glass 4. In alternative embodiments, provision may be made of further scale specifications on the oil inspection glass 4. Via the oil inspection glass 4, which extends even beyond the maximum oil level 5, the position of the outlet opening 22 is also able to be identified.

If, then, for example during a maintenance procedure, a minimum oil level is read off, the compressor oil 3 is replenished via the filling opening 21 of the oil filler neck 2. Accordingly, the level of the compressor oil 3 in the receiving volume of the compressor housing 1 rises. The air volume displaced by the compressor oil 3 in the receiving volume can escape via the oil filler neck until the level of the compressor oil 3 has risen to such an extent that the outlet opening 22 is covered by the compressor oil. In this way, the remaining air volume in the compressor housing 1 is enclosed between the outlet opening 22 and the compressor housing 1 and forms an air cushion 7. The air cushion 7 prevents the level of the compressor oil 3 in the receiving volume from rising further. Since the outlet opening 22 is arranged here at the height of the maximum oil level 5, it is thus the case that further filling of the receiving volume with the compressor oil 3 and thus overfilling are prevented. The compressor oil 3 can then rise only in the oil filler neck 2 itself, as is indicated by the arrow. The oil filler neck has a predetermined height between the filling opening 21 and the outlet opening 22 such that a rise in the oil filler neck 2 or the reaching of the maximum oil level 5 can be identified with adequate tolerance, without compressor oil 3 immediately exiting the filling opening 21.

Figure 3:
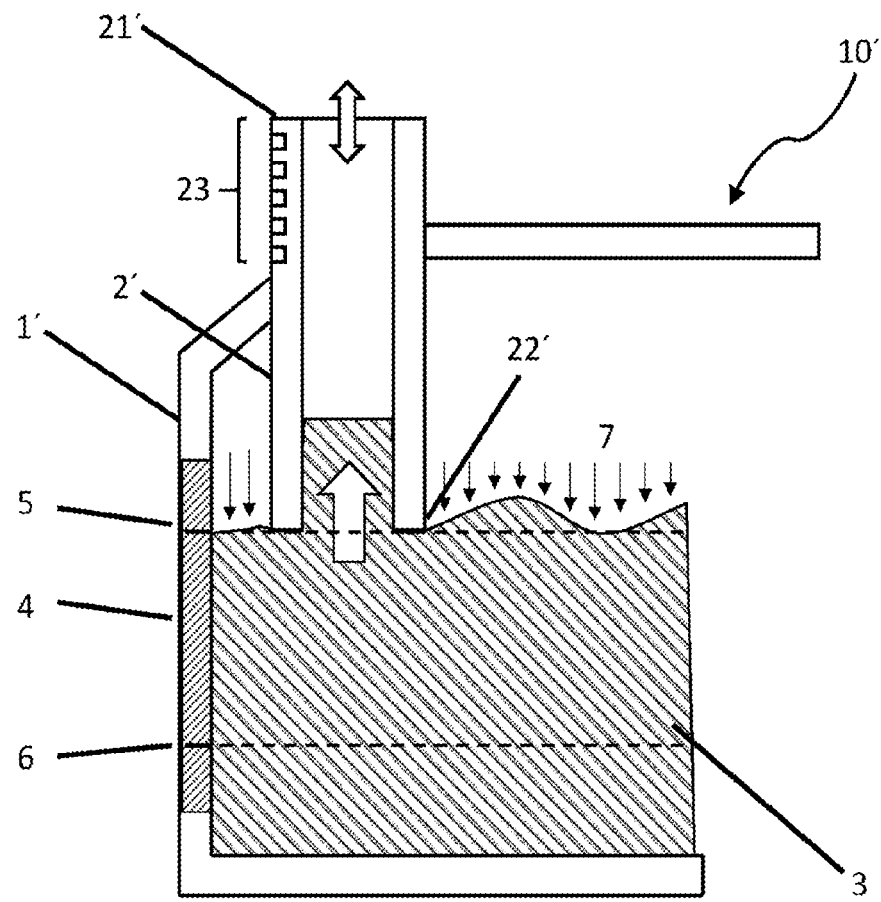
FIG. 3 shows a schematic cross-sectional illustration of a compressor-oil-receiving apparatus according to a second exemplary embodiment.

FIG. 3 shows a schematic cross-sectional illustration of a compressor-oil-receiving apparatus 10' according to a second exemplary embodiment. The second embodiment differs from the first embodiment with regard to the configuration of the oil filler neck 2' and the corresponding compressor housing 1'. Otherwise, the compressor-oil-receiving apparatus 10' of the second embodiment is constructed analogously to the compressor-oil-receiving apparatus 10 of the first embodiment, so that identical reference signs are used in this respect and a description in this respect according to the first embodiment is transferable to the second embodiment.

In the second embodiment, the oil filler neck 2' of the compressor-oil-receiving apparatus 10' is not formed integrally with the compressor housing 1' but is able to be screwed into the compressor housing 1' via a threaded connection (not shown). Accordingly, the position of the outlet opening 22' of the oil filler neck 2' can be set via the screwing-in depth, as is indicated by the double arrow in the region of the filling opening 21'. Consequently, it is also the case that the maximum oil level 5 or a maximum level height of the compressor oil 3 in the receiving volume of the compressor housing 1' is settable. The threaded connection may have additional sealing mechanisms for preventing air from escaping from the air volume 7 which, when the outlet opening 22' is covered, is enclosed between the compressor housing 1', and the compressor oil that has been introduced. In alternative embodiments, instead of a screw connection, it is also possible for provision to be made of other position-setting mechanisms, such as clamping clips or the like.

Moreover, in a region which projects according to position from that side of the compressor housing 1' which is directed away from the receiving volume, the oil filler neck 2' has a scale 23 as a position indicator for the oil filler neck 2'. The scale which is just not concealed by the compressor housing 1' then indicates the respective screwing-in depth. In alternative embodiments, the position indicator may also be provided via a distance meter which detects a distance between the outlet opening 22' and a reference point in the rise height of the level, the reference point being for example a compressor-housing wall situated opposite the outlet opening in the rise height. The distance signal can be reproduced by an indicator as an analog distance value or by light indicators of different colors.

Disclosed embodiments are not limited to the embodiments described. Even though the oil filler neck extends perpendicularly to the oil level in the embodiments described above, for example, the oil filler neck may also extend in an inclined manner in relation thereto.

LIST OF REFERENCE SIGNS

1, 1' Compressor housing
2, 2' Oil filler neck
3 Compressor oil
4 Oil inspection glass (fill-level indicator)
5 Maximum oil level
6 Minimum oil level
7 Air cushion (air volume)
10, 10' Compressor-oil-receiving apparatus
21, 21' Filling opening (oil filler neck)
22, 22' Outlet opening (oil filler neck)
23 Scale (position indicator)
A Compressor housing
B Oil filling opening
C Compressor oil
D Oil inspection glass (fill-level indicator)
E Maximum oil level
F Minimum oil level

The invention claimed is:

1. A compressor-oil-receiving apparatus for a compressor system, for being filled with a compressor oil for transfer into the compressor system, the apparatus comprising:
   a housing which forms a receiving volume for the compressor oil, and
   an oil filler neck with a filling opening on a side which is directed away from the receiving volume and with an outlet opening on a side which is directed toward the receiving volume,
   wherein the oil filler neck forms a housing opening for filling of the receiving volume with the compressor oil, and the outlet opening is arranged such that, through filling of the receiving volume, an air volume enclosed by the housing, and the compressor oil that has been introduced is formed in the receiving volume.

2. The compressor-oil-receiving apparatus of claim 1, wherein the oil filler neck extends at least partially into the enclosed air volume.

3. The compressor-oil-receiving apparatus of claim 1, wherein the filling opening and the outlet opening are arranged at different heights in the direction of a rise height of the compressor oil in the receiving volume, and the distance of the filling opening from the respective level height of the compressor oil in the receiving volume, at least until an intended maximum oil level has been reached, is greater than the distance of the outlet opening from the respective level height.

4. The compressor-oil-receiving apparatus of claim 1, wherein the position of the outlet opening corresponds to the maximum oil level.

5. The compressor-oil-receiving apparatus of claim 1, wherein the position of the outlet opening is settable.

6. The compressor-oil-receiving apparatus of claim 5, wherein the oil filler neck is movable at least with a movement component in the direction of the rise height of the compressor oil in the receiving volume.

7. The compressor-oil-receiving apparatus of claim 6, wherein the oil filler neck has a position indicator which is configured to indicate a position of the outlet opening.

8. The compressor-oil-receiving apparatus of claim 7, wherein the filling opening, at least until a predetermined depth of movement of the oil filler neck into the receiving volume has been reached, projects beyond a side of the housing that is directed away from the receiving volume and, in this projecting region, has a scale as a position indicator.

9. The compressor-oil-receiving apparatus of claim 1, wherein the compressor-oil-receiving apparatus has a fill-level indicator which indicates at least a minimum oil level and/or the maximum oil level.

10. The compressor-oil-receiving apparatus as claimed in of claim 9, wherein the fill-level indicator is at least one oil inspection glass in the housing, which, at least in the region of the minimum oil level and/or the maximum oil level, extends in the direction of the rise height of the compressor oil in the receiving volume.

11. The compressor-oil-receiving apparatus of claim 10, wherein the oil inspection glass is configured such that, via the oil inspection glass (4), the position of the outlet opening of the pressure connector in the receiving volume is identifiable.

12. The compressor-oil-receiving apparatus of claim 10, wherein the oil inspection glass and/or an adjoining region of the housing have/has a scale.

13. A compressor system having a compressor-oil-receiving apparatus of claim 1, wherein the receiving volume for the compressor oil includes an oil sump of the compressor system.

14. The compressor system of claim 13, wherein the compressor system includes a screw compressor.

* * * * *